United States Patent [19]

Bower et al.

[11] Patent Number: 5,764,629
[45] Date of Patent: Jun. 9, 1998

[54] METHOD AND APPARATUS FOR AVOIDING COLLISIONS IN AN ELECTRONIC BUSINESS SET TERMINAL

[75] Inventors: David M. Bower, Windsor; Deborah W. Trefz, Cotati, both of Calif.

[73] Assignee: DSC Communications Corporation, Plano, Tex.

[21] Appl. No.: 612,115

[22] Filed: Mar. 8, 1996

[51] Int. Cl.[6] .................................. H04J 3/12; H04L 5/16
[52] U.S. Cl. ........................... 370/296; 370/384; 370/445
[58] Field of Search ................................... 370/246, 247, 370/249, 250, 251, 282, 294, 296, 357, 360, 384, 445, 447, 461, 662, 523, 524; 340/825.08, 825.54; 379/5, 9, 12, 27, 31

[56] References Cited

U.S. PATENT DOCUMENTS

| | | | |
|---|---|---|---|
| 4,210,780 | 7/1980 | Hopkins et al. | 370/445 |
| 4,500,990 | 2/1985 | Akashi | 370/445 |
| 4,661,902 | 4/1987 | Hochsprung et al. | 370/445 |
| 5,130,983 | 7/1992 | Heffner, III | 370/449 |
| 5,155,727 | 10/1992 | Borup et al. | 370/445 |

Primary Examiner—Alpus H. Hsu
Attorney, Agent, or Firm—Baker & Botts, L.L.P.

[57] ABSTRACT

An electronic business set terminal (24) includes a signaling gate array (40) that performs reception and transmission of 8 kHz signaling messages while avoiding collisions that may result in message loss. The signaling gate array (40) includes a receiver section (50) that detects for activity on an 8 kHz signaling line (20). A start bit detector (62) identifies the beginning of a receive message that is collected by a data collector (64). A transmitter section (52) sends a transmit message when no activity is present on the 8 kHz signaling line (20) and there is no indication from the start bit detector (62) that a receive message is in the process of being received. A collision detector and avoidance unit (72) checks for activity on the 8 kHz signaling line (20) while the transmitter section (52) awaits for a zero crossing to occur on an 8 kHz clock signal used in sending the transmit message. Upon initiation of transmission, the collision detector and avoidance unit (72) checks for activity on the 8 kHz signaling line (20) while sending each zero bit of the transmit message. The collision detector and avoidance unit (72) is driven by a collision window pulse that ensures that activity on the 8 kHz signaling line (20) is checked at the proper times to eliminate potential false activity status.

20 Claims, 12 Drawing Sheets

METHOD AND APPARATUS FOR AVOIDING COLLISIONS IN AN ELECTRONIC BUSINESS SET TERMINAL

TECHNICAL FIELD OF THE INVENTION

The present invention relates in general to telecommunications systems and more particularly to a method and apparatus for avoiding collisions in an electronic business set terminal.

BACKGROUND OF THE INVENTION

Communications between an electronic business set telephone and an electronic business set terminal occur over two channels—a primary channel and a secondary channel. The primary channel is a 3kHz voice frequency channel on which voice and alert toning are carried. The secondary channel is an 8 kHz out of band half duplex signaling channel that carries signaling and other supervisory information. Signaling information can only travel in one direction at a time on the secondary channel, requiring the telephone and terminal providing electronic business services to share this communication path without stepping on each other's transmissions. In order to share the secondary channel, the electronic business set telephone and terminal must implement a collision detection scheme to prevent transmission while activity is present on the secondary channel. Many collision detection schemes do not properly establish when a collision has occurred or provide techniques for anticipating and avoiding possible collisions. Therefore, it is desirable to provide an improved collision detection and avoidance technique in order to improve the reliability of 8 kHz signaling message transmission and reception.

SUMMARY OF THE INVENTION

From the foregoing, it may be appreciated that a need has arisen to provide an improved collision detection and avoidance technique in order to properly detect and avoid collisions in 8 kHz signaling message transmissions between a telephone and a terminal providing electronic business set services. In accordance with the present invention, a method and apparatus for avoiding collisions in an electronic business set terminal are provided that substantially eliminate or reduce disadvantages and problems associated with conventional collision detection techniques.

According to an embodiment of the present invention, there is provided a method of avoiding collisions in an electronic business set terminal that includes determining that a transmit message is ready to be sent on a communication path. Transmission commences upon the occurrence of a zero crossing in a clock signal used for sending the transmit message. While awaiting for the zero crossing, the communication path is monitored for the presence of activity or the receipt of a receive message. If activity is not present and there is no receive message in the process of being received, the transmit message is sent to its destination. If activity is present or a receive message is in the process of being received, transmission is delayed until these events are no longer occurring. During transmission, activity on the communication path is monitored while sending each zero bit of the transmit message. The presence of any activity during transmission results in unreliable data being sent over the communication path, requiring an attempt at resending the transmit message.

The present invention provides various technical advantages over conventional collision detection schemes. For example, one technical advantage is to monitor for activity on the communication path in the interval between transmit message ready and the occurrence of the zero crossing of the transmit 8 kHz signal. Another technical advantage is to check for the presence of activity on the communication path while sending each zero bit of the transmit message. Another technical advantage is to establish a collision window within which activity presence on the communication path is checked to avoid detecting false collisions and ensure proper collision detection. Yet another technical advantage is to disable start bit detection while still being able to monitor activity status on the communication path. Still another technical advantage is to en-able collision detection during specific intervals of the transmit message. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
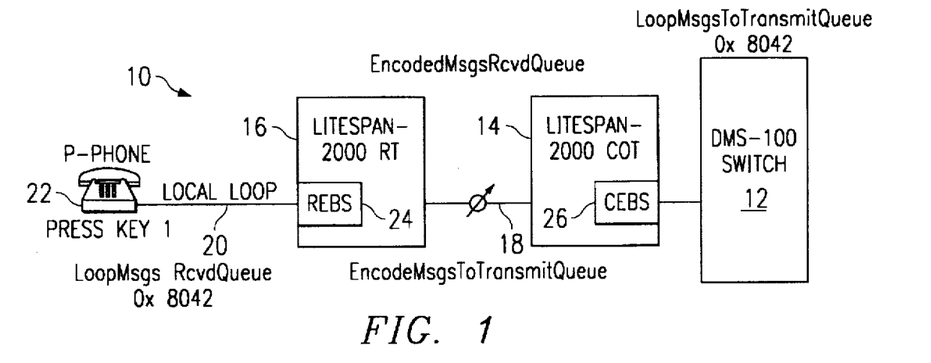
FIG. 1 illustrates a block diagram of a telecommunications network.

FIG. 1 is a block diagram of a telecommunications network 10. Telecommunications network 10 includes a telecommunication switch 12 that communicates with a digital loop carrier central office terminal 14 associated therewith. Digital loop carrier central office terminal 14 communicates with a digital loop carrier remote terminal 16 through a fiber optic connection 18. Digital loop carrier remote terminal 16 communicates with subscribers over a local loop 20. A subscriber having an electronic business set telephone 22 communicates specifically with a remote electronic business set line card 24 of digital loop carrier remote terminal 16 over local loop 20. Remote electronic business set line card 24 processes electronic business set messages for communication with electronic business set telephone 22 and a central electronic business set line card 26 of digital loop carrier central office terminal 14.

Telecommunications network 10 performs end-to-end messaging associated with electronic business set service. This end-to-end messaging includes 8 kHz signaling message reception at remote electronic business set line card 24 from electronic business set telephone 22. Upon receipt of the 8 kHz signaling message, remote electronic business set line card 24 returns a positive acknowledgment signal to electronic business set telephone 22. The positive acknowledgment signal indicates that a valid 8 kHz signaling message has been received at remote electronic business set line card 24. Remote electronic business set line card 24 encodes the 8 kHz signaling message into an appropriate format for transmission to central electronic business set line card 26 over fiber optic connection 18.

Central electronic business set line card 26 receives and decodes the encoded format for proper reconstruction into the 8 kHz signaling message format. Central electronic business set line card 26 transmits the reconstructed 8 kHz signaling message to telecommunication switch 12. Telecommunication switch 12 returns positive acknowledgment signal to central electronic business set line card 26, indicating that a valid 8 kHz signaling message has been received. Conventional electronic business set service techniques require that the 8 kHz signaling message be sent over the entire connection between electronic business set telephone 22 and telecommunication switch 12 before an acknowledgment signal is sent and received. Such a technique produces a delay into the system that adversely affects the electronic business set service of telecommunications network 10. By immediately returning an acknowledgment signal, the delay time is reduced and the subsequent operation of telecommunication network 10 is enhanced.

Electronic business set telephone 22 communicates with telecommunication switch 12 through two channels—a primary voice frequency channel and a secondary supervisory channel. The primary voice frequency channel is a 3kHz voice frequency channel in which voice and ringing is carried. Signaling and supervisory messages are carried on the secondary supervisory channel which is the half duplex 8 kHz transmission path. The half duplex operation of the 8 kHz secondary supervisory channel requires that particular processing be performed by remote electronic business set line card 24 and central electronic business set line card 26 in order that valid 8 kHz signaling message transmission occurs in telecommunications network 10.

Figure 2:
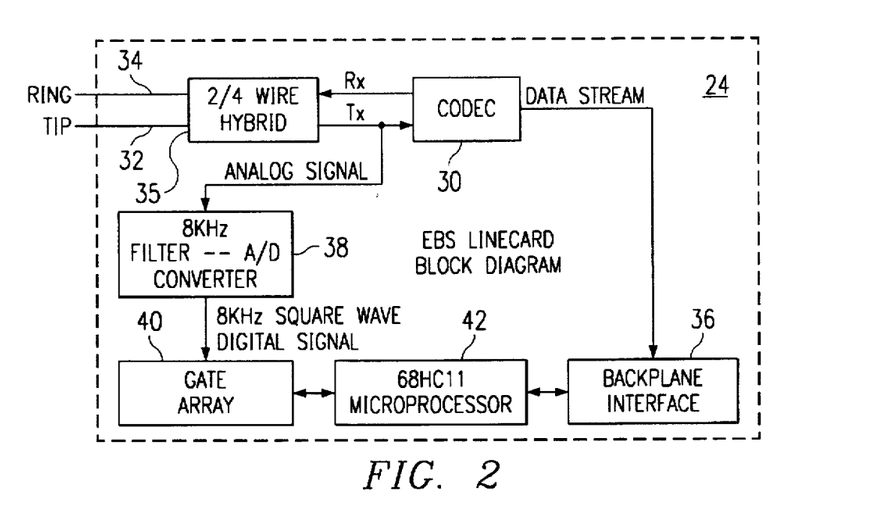
FIG. 2 illustrates a block diagram of an electronic business set terminal of the telecommunications network.

FIG. 2 is a block diagram of remote electronic business set terminal 24. Remote electronic business set terminal 24 and central electronic business set terminal 26 have similar hardware components and perform similar functions. The main differences are that the central electronic business set terminal 26 includes a loop closure circuit while the remote electronic business set terminal 24 includes a battery feed circuit. The following functional discussion is with respect to remote electronic business set terminal 24 though it could equally be applied to central electronic business set terminal 26.

Remote electronic business set terminal 24 includes a codec unit 30 that receives the primary and secondary channels over a tip line 32 and a ring line 34 through a two/four wire hybrid 35. Codec unit 30 converts the 3kHz primary voice channel into a 64 kilobit per second pulse code modulated digital data stream that is placed on a backplane of digital loop carrier remote terminal 16 through a backplane interface 36. Backplane interface 36 provides conversion of the 64 kilobit per second data stream to and from a backplane. Backplane interface 36 also provides the communication and provisioning access to the subscriber.

Tip line 32 and ring line 34 are also connected to a filter and converter unit 38 through two/four wire hybrid 35. Filter and converter unit 38 extracts the 8 kHz secondary signaling channel and converts the 8 kHz signaling information into a digital form for processing by a signaling gate array 40. Signaling gate array 40, in conjunction with microprocessor 42, handles detection of the 8 kHz signaling message, zero crossing transmission requirements, collision avoidance, and message transmission through backplane interface 36.

Figure 3:
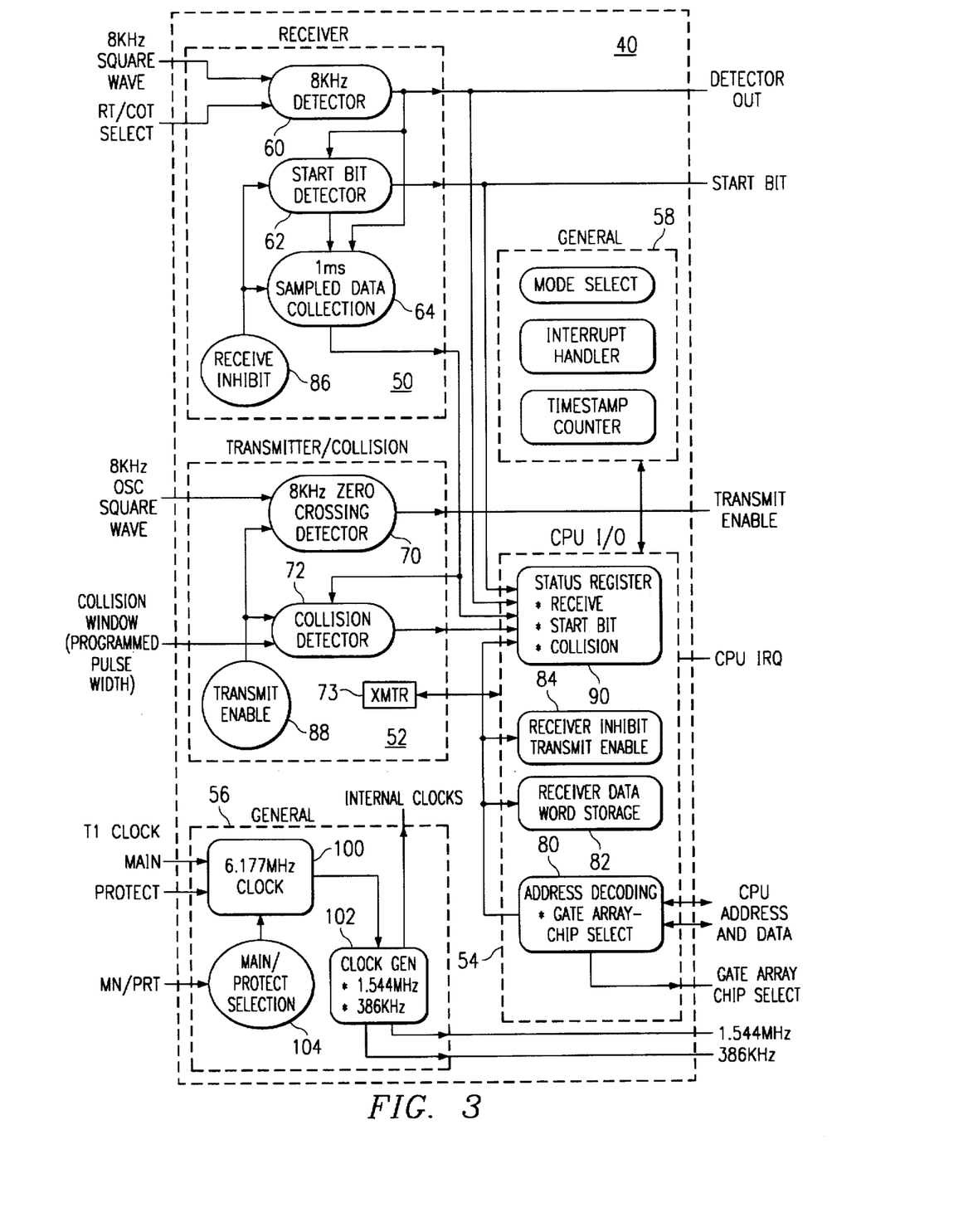
FIG. 3 illustrates a block diagram of a signaling gate array of the electronic business set terminal.

FIG. 3 is a block diagram of signaling gate array 40. Signaling gate array 40 includes a receiver section 50, a transmitter section 52, a microprocessor interface section 54, and general sections 56 and 58. Receiver section 50 includes an 8 kHz detector 60 to detect the presence of an 8 kHz signaling message, a start bit detector 62 that determines the beginning of an 8 kHz message and a data collector 64 that holds the received 8 kHz signaling message for retrieval by microprocessor 42. Transmitter section 52 includes a zero crossing detector 70 that determines the proper timing for transmission to occur and a collision avoidance detector 72 that determines the presence of 8 kHz activity at receiver section 50 in order to properly transmit a valid 8 kHz signaling message.

Microprocessor interface section 54 includes an address decoder 80 for address and data communication between microprocessor 42 and signaling gate array 40. Microprocessor interface section 54 also includes a word storage unit 82 for holding the 8 kHz signaling message to allow encoding by microprocessor 42 prior to transmission to central electronic business set line card 26 over fiber optic connection 18. An inhibit/enable decoder 84 provides a receive inhibit signal 86 at receiver section 50 and a transmit ready signal 88 at transmitter section 52. A status register 90 provides status flags indicating operating states for receiver section 50 and transmitter section 52.

General sections 56 and 58 perform housekeeping functions for signaling gate array 40. Main and protection clock signal are received at a clocking unit 100 and one is selected and sent to a clock generator 102 as determined by a selector 104. Clock generator 102 performs the required clock division to achieve desired clock frequencies for signaling gate array 40.

Figure 4A:
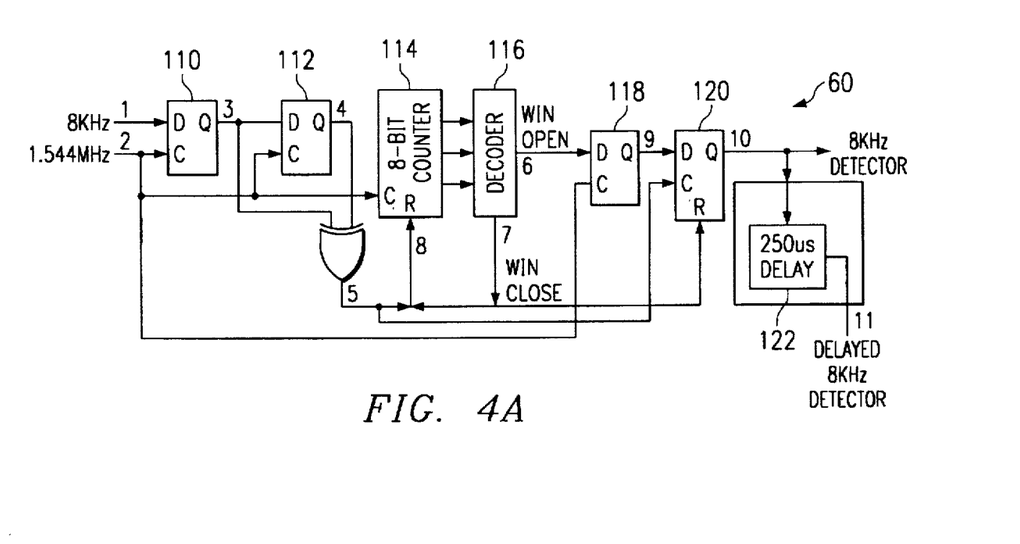
FIGS. 4A–B illustrate block and timing diagrams of a receiver section of the signaling gate array.
Figure 4B:
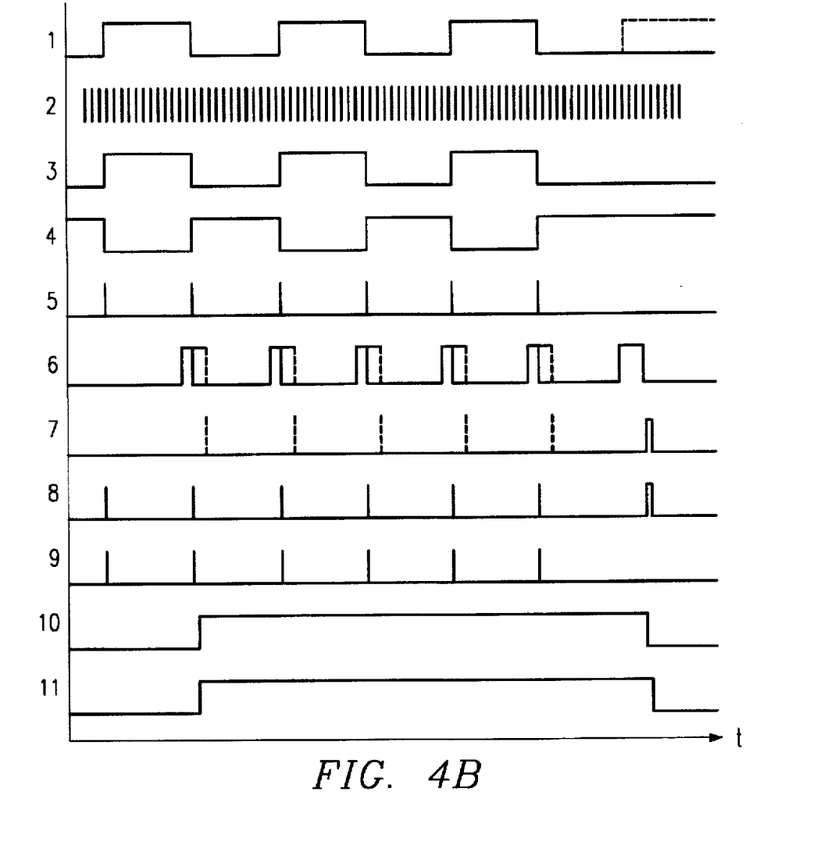

FIGS. 4A–B are a block diagram and a timing diagram of 8 kHz detector 60 within receive receiver section 50. 8 kHz detector 60 receives 8 kHz signaling messages over an 8 kHz square wave digital signal from filter and converter 38. The format for 8 kHz signaling messages carried by the 8 kHz square wave digital signal is shown in Appendix A. The 8 kHz square wave digital signal is routed to a latch 110 clocked at a rate of 1.554 MHz as generated by clock generator 102. The 1.554 MHz clock is used for counting and timing in receiver section 50 and thus the 8 kHz square wave digital signal is synchronized to this clock. The output of latch 110 drives a latch 112 and the outputs of latches 110 and 112 are exclusive-ored to produce a reset pulse that occurs every 62.5 microseconds. The reset pulse is used to reset an 8 bit counter 114 that drives combinational logic used to decode certain counter combinations at a decoder 116. Decoder 116 generates outputs to open and close a window within which the incoming 8 kHz square wave digital signal transitions for detection to occur. If a transition occurs within the window, then a valid 8 kHz signaling message has been detected.

The valid 8 kHz receive signaling message is fed through latches 118 and 120 to produce an 8 kHz detector output. The 8 kHz detector output drives status register 90 of microprocessor interface section 54. This allows microprocessor 42 to check for any 8 kHz activity at receiver section 50 prior to sending an 8 kHz transmit signaling message. If the receiver is active, microprocessor 42 will delay transmission of an 8 kHz transmit signaling message until no 8 kHz activity is present at receiver section 50. The 8 kHz detector output is routed through a delay unit 122 for timing purposes. However, the non-delayed 8 kHz detector output is used for collision handling in order to improve collision avoidance and detection. FIG. 4B shows the timing characteristics of 8 kHz detector 60 at different points within the block diagram of FIG. 4A.

Figure 5:
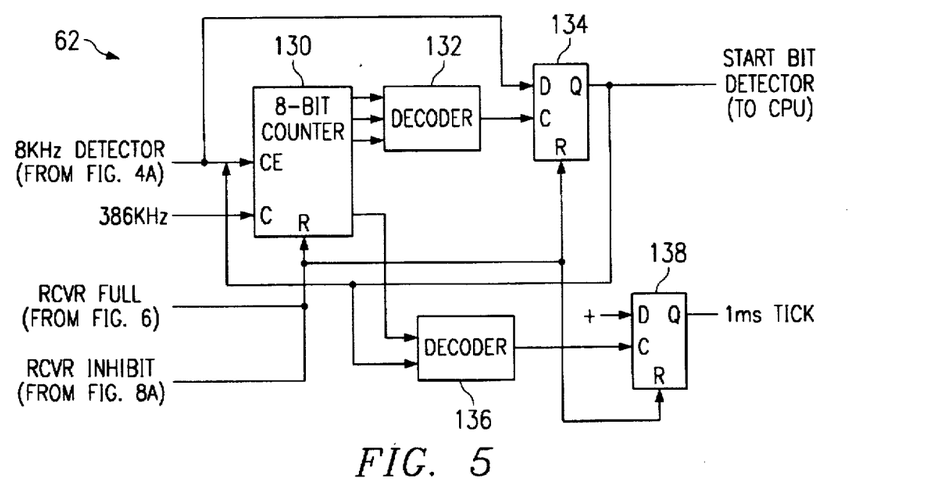
FIG. 5 illustrates a block diagram of a start bit detector of the signaling gate array.

FIG. 5 is a block diagram of start bit detector 62. Start bit detector 62 receives the 8 kHz detector output from 8 kHz detector 60 at an 8-bit counter 130. 8-bit counter 130 is triggered on the rising edge of the 8 kHz detector output and begins counting upon detection of 8 kHz activity at a clock rate of 386kHz generated by clock generator 102. A decoder 132 monitors the count of 8 bit counter 130. When the count of 184 is reached (477 microseconds), decoder 132 sets latch 134 to assert a start bit detector output. The start bit detector output will stay asserted until all 16 bits of the 8 kHz receive signaling message has been clocked in and stored in data collector 64. After assertion of the start bit detector output, 8-bit counter 130 is set to count to 193 then reset to begin a new count. A decoder 136 determines when the count of 193 has been reached and produces a 1 millisecond receive tick pulse through a latch 138 that begins after a start bit has been detected. The 1 millisecond receive tick pulse is used to clock in the 16 bits of the 8 kHz receive signaling message into data collector 64.

Figure 6:
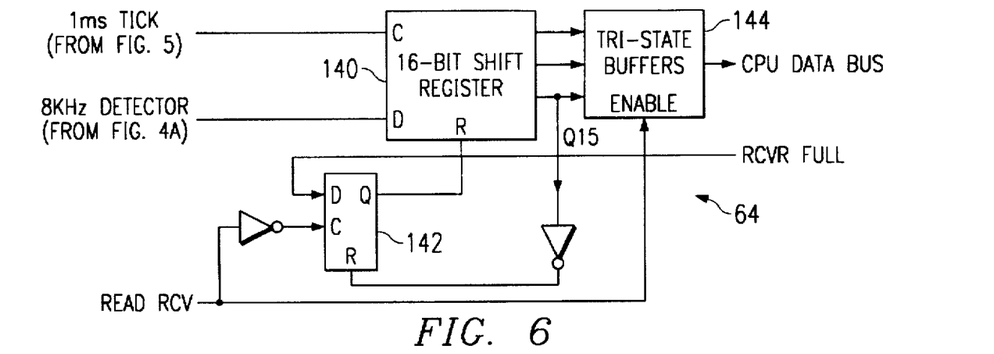
FIG. 6 illustrates a block diagram of a data collection section of the signaling gate array.

FIG. 6 is a block diagram of data collector 64. Data collector 64 receives the 8 kHz detector output from 8 kHz detector 60 and the 1 millisecond receive tick pulse from start bit detector 62 at a 16-bit shift register 140. When the sixteenth tick has occurred, the most significant bit of the resulting 16-bit word will go high since the start bit which is always a 1 has reached this position. When the most significant bit of the 16-bit word within 16-bit shift register 140 goes high, a RCVR Full signal is generated that resets 8 bit counter 130 and latch 138 of start bit detector 62 in order to shut down the start bit detector output and 1 millisecond receive tick pulse. The RCVR Full signal sets a CPUIRQ signal at microprocessor interface 54 to inform microprocessor 42 that data is ready to be read. Microprocessor 42 begins routing the 16-bit 8 kHz receive signaling message by asserting a Read RCV signal that resets 16 bit shift register 140 through a latch 142 and enables tristate buffers 144 holding the 16-bit 8 kHz receive signaling message for transmission onto the CPU data bus.

Figure 7A:
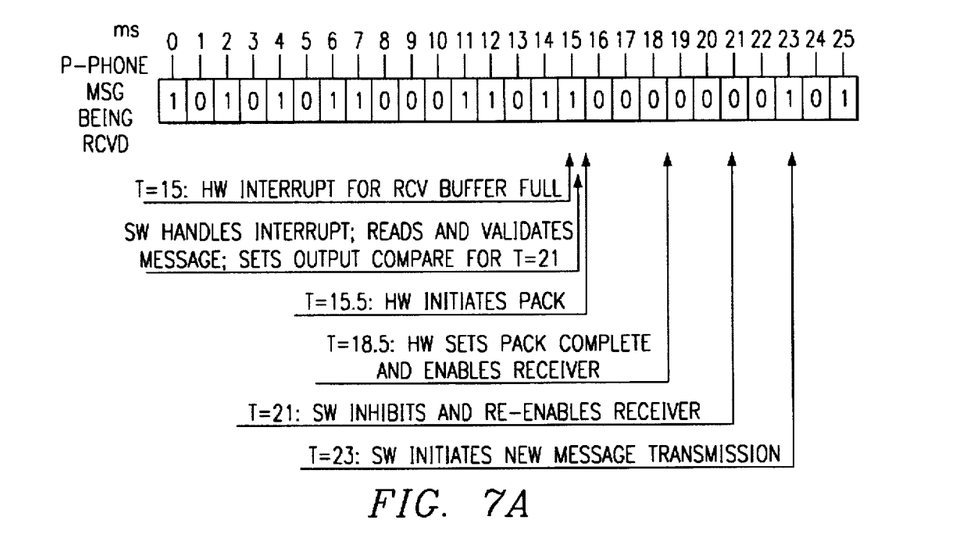
FIGS. 7A–C illustrate a message reception capability of the signaling gate array.
Figure 7B:
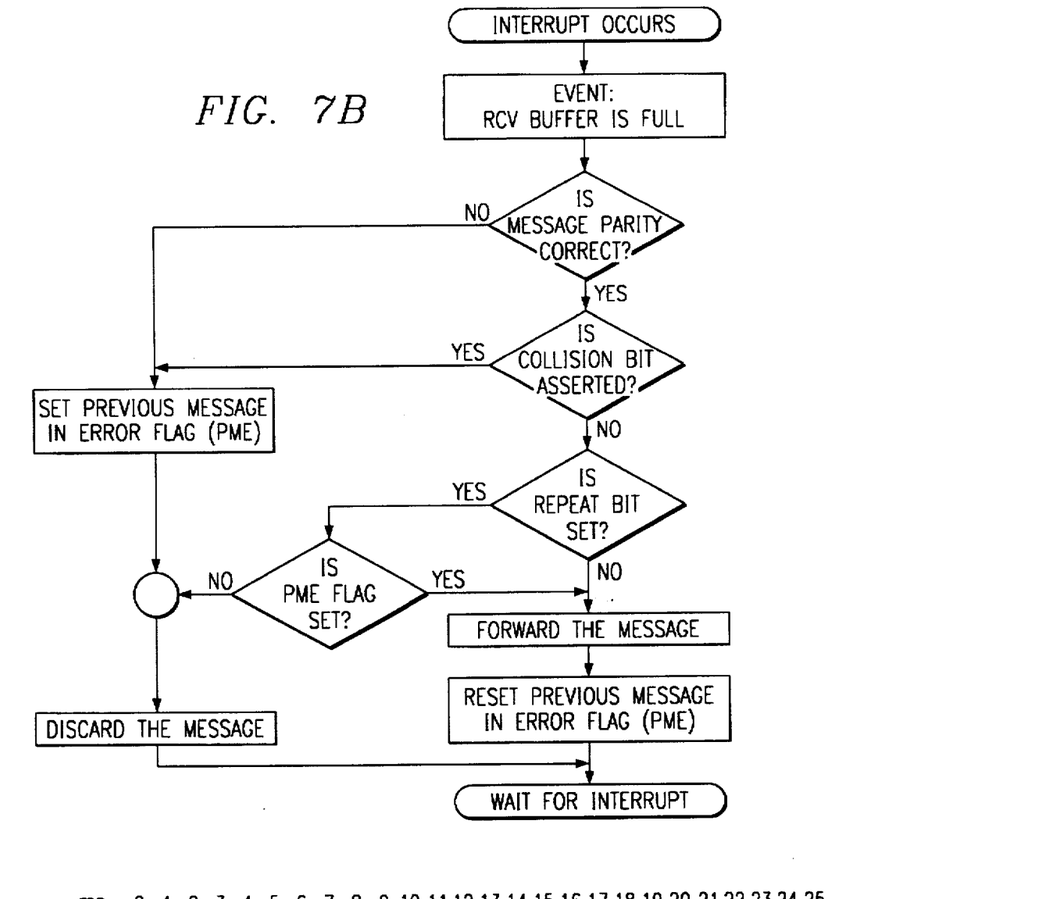
Figure 7C:
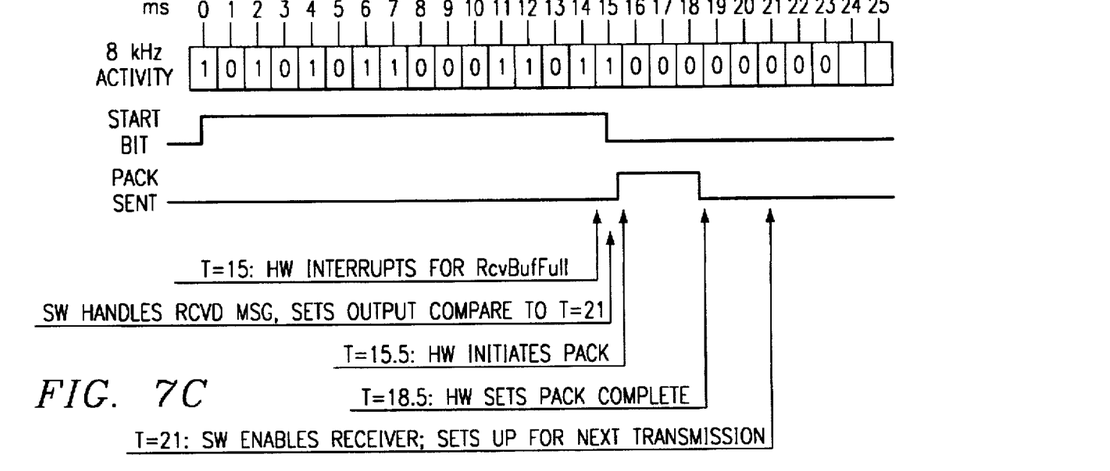

FIGS. 7A–C show the timing and flow performed by software within microprocessor 42 for reception of an 8 kHz receive signaling message. FIG. 7A shows the timing for normal loop message reception. FIG. 7B shows the timing for a positive acknowledge signal transmission. FIG. 7C shows the steps performed during message reception.

An interrupt occurs when data collector 64 asserts the RCVR Full signal. Microprocessor 42 asserts the Read RCV signal to read the 8 kHz receive signaling message and clear tristate buffers 144 and the RCVR Full signal. Gate array 40 checks the parity bit of the 8 kHz receive signaling message. If the parity is wrong, an internal Previous Message in Error flag is set and the invalid message is discarded. If the parity is correct, microprocessor 42 checks the collision bit of the 8 kHz receive signaling message to see if a collision was detected. If a collision was detected, the internal Previous Message in Error flag is set and the invalid message is discarded.

If parity is correct and no collision was detected, microprocessor 42 checks the repeat bit of the 8 kHz receive signaling message to determine if this is a repeat transmission. The electronic business set telephone 22 will retransmit a message with the repeat bit set if no positive acknowledge signal has been received. If the repeat bit is set, microprocessor 42 determines whether the internal Previous Message in Error flag is set. If not, the message is discarded in order to prevent repeated forwarding of the same message. If the internal Previous Message in Error flag is set, the message is forwarded for encoding. The message is also forwarded for encoding if the repeat bit is not set. After forwarding of the message, the internal Previous Message in Error flag is reset.

After gate array 40 validates an 8 kHz receive signaling message for parity and no collision bit set, a positive acknowledge signal is sent to electronic business set telephone 22. The positive acknowledge signal is returned immediately after reception of a valid message for a duration of 3 milliseconds to allow for detection by electronic business set telephone 22. After transmission of the positive acknowledge signal, microprocessor 42 inhibits and re-enables receiver section 50 in order to prepare for reception of a new message.

Figure 8:
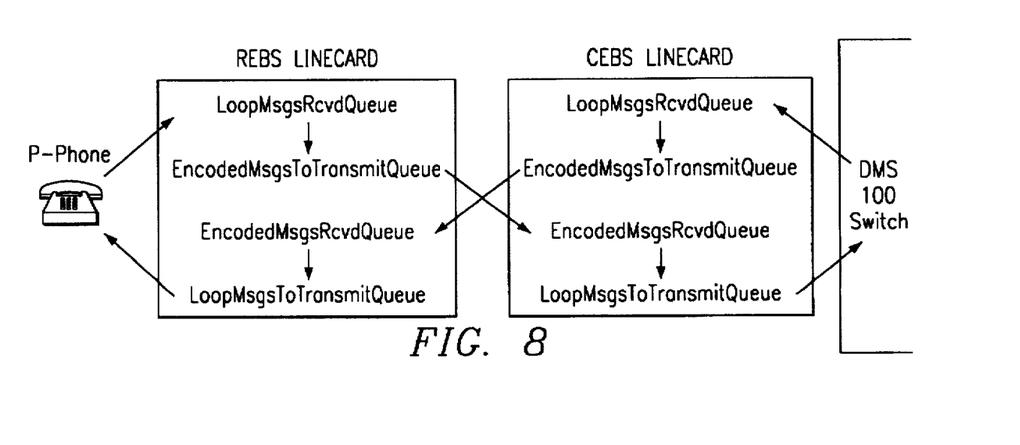
FIG. 8 illustrates a message flow in the telecommunications network.

FIG. 8 shows the transfer of 8 kHz signaling messages within telecommunications network 10. A valid 8 kHz receive signaling message is forwarded to a Loop Msgs Rcvd Queue. Messages found in the Loop Msgs Rcvd Queue are encoded and placed into an Encoded Msgs To Transmit Queue. Signaling bits within the Encoded Msgs To Transmit Queue represent the encoded 8 kHz receive signaling message and are transmitted over fiber optic connection 18 to central electronic business set line card 26. Central electronic business set line card 26 places these signaling bits into an Encoded Msgs Rcvd Queue where they are subsequently decoded into 8 kHz format and placed into a Loop Msgs To Transmit Queue for transmission to telecommunication switch 12.

Transmission of encoded 8 kHz signaling messages over fiber optic connection 18 occur only once for each message using a four bit ABCD signaling channel. Thus, remote electronic business set line card 24 must be properly synchronized with central business set line card 26 to ensure that each end knows that the other end is sending and receiving. Various idle codes are used to communicate how each end is seeing the other end's signaling information. The sending end can adjust its signaling until the far end is able to report that the signaling is properly framed. Messages received over fiber optic connection 18 are checked for validity, being discarded if invalid and being sent on for reconstruction if valid.

Figure 9:
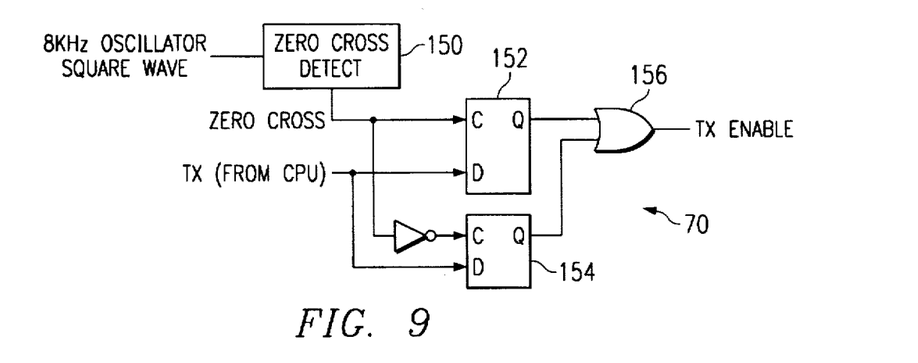
FIG. 9 illustrates a block diagram of a transmit enable section of the signaling gate array.

FIG. 9 is a block diagram of 8 kHz zero crossing detector 70. Eight kHz zero crossing detector 70 includes a zero cross detect unit 150 that receives an external 8 kHz oscillator sine wave and asserts a zero crossing signal to a latch 152 and a latch 154 when a zero crossing occurs at the 8 kHz oscillator sine wave. Transmitter section 52 becomes enabled when a logic level one needs to be transmitted. 8 kHz zero crossing detector 70 generates a TX ENABLE signal from an OR gate 156 whenever transmit signal TX and zero cross signal are asserted at the same time. Both edges of the zero crossing are used in order to reduce timing errors to a worse case of 62.5 microseconds. When gate array 40 sends a logic level zero and a logic level one is currently being transmitted, the TX ENABLE signal will go low at the next zero crossing.

Figure 10A:
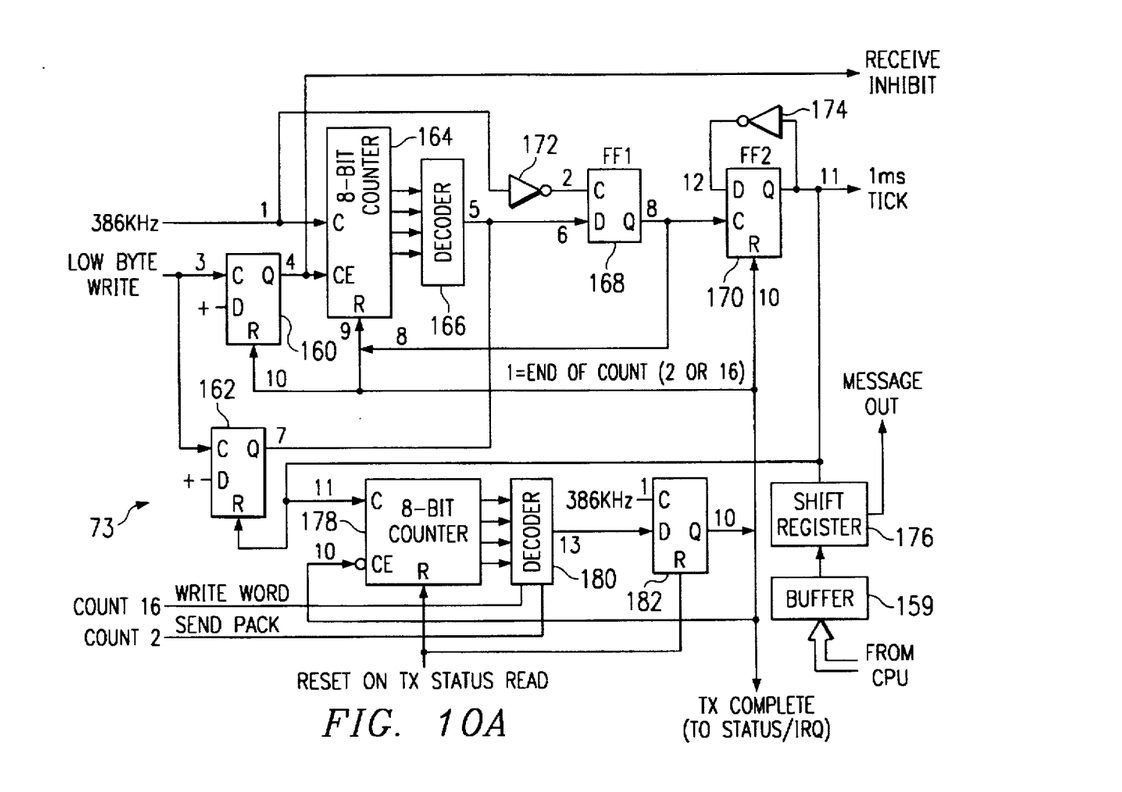
FIGS. 10A–B illustrate block and timing diagrams of a transmitter section of the signaling gate array.
Figure 10B:
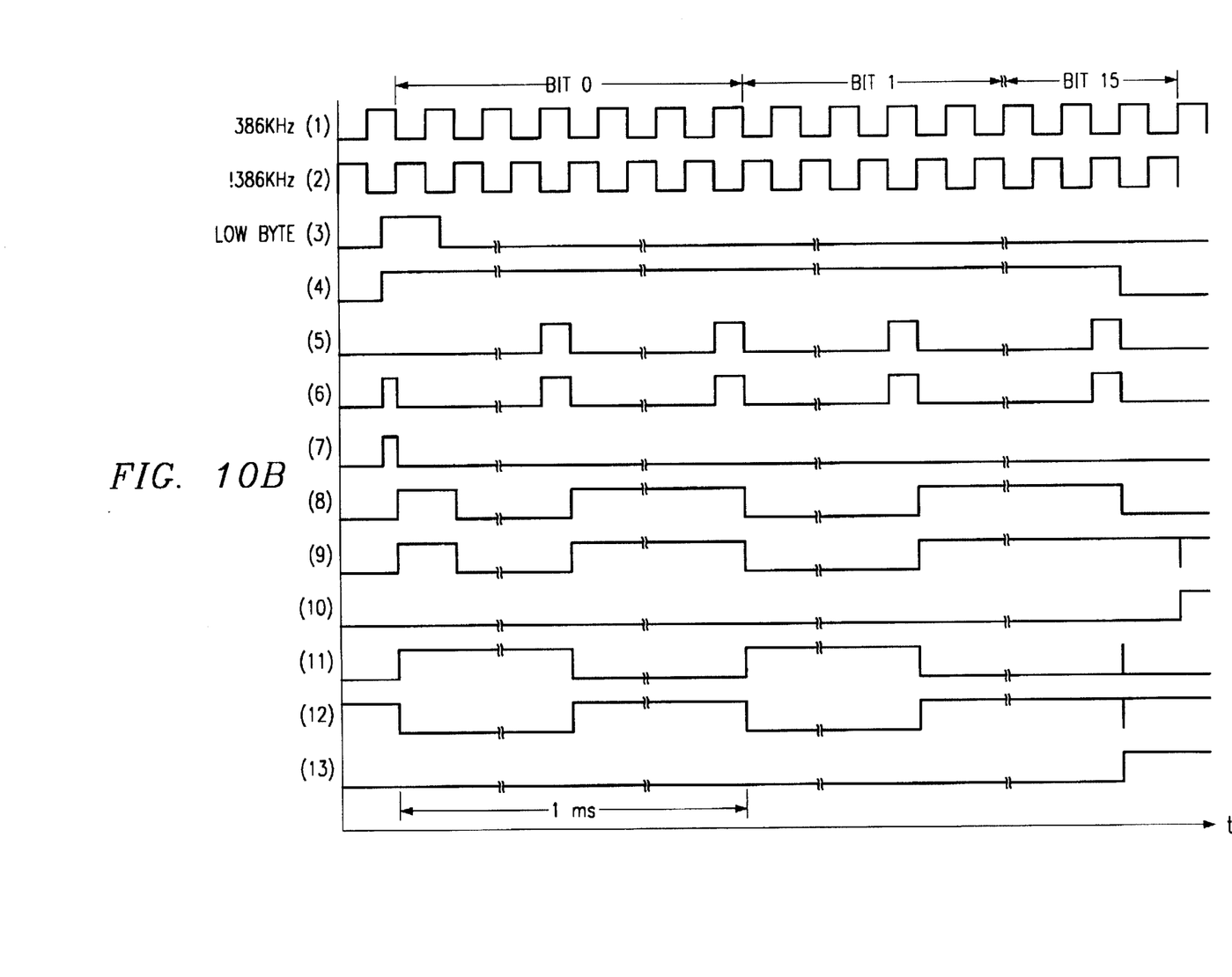

FIGS. 10A–B are block and timing diagrams of transmitter 73 in transmitter section 52. Transmitter 73 receives 16 bits of an 8 kHz transmit signaling message from microprocessor interface 54 at a buffer 159. The 16 bits are sent to transmitter 73 by two 8-bit writes. Transmission commences as soon as the low order bits are received. Indication that the lower byte has been received occurs at latches 160 and 162. Latch 160 provides a RECEIVE INHIBIT signal which disables start bit detector 62 but keeps 8 kHz detector 60 active for 8 kHz detection. Transmitter 73 generates a 1 millisecond transmit pulse tick from an 8-bit counter 164, decoder 166, flip-flop 168, flip-flop 170 and inverters 172 and 174. The 1 millisecond transmit pulse tick is used to transmit the 16 bits from a shift register 176 as provided by buffer 159.

Depending on the transmission, transmitter 73 generates a TX COMPLETE signal upon completing transmission of the required bits. An 8-bit counter 178, a decoder 180, and a latch 182 are shown to generate the TX COMPLETE signal. For a normal 8 kHz transmit signaling message, decoder 180 receives a COUNT 16 signal to allow for 16 1 millisecond transmit pulse ticks to occur before asserting the TX COMPLETE signal. For a positive acknowledge signal transmission, decoder 180 receives a COUNT 2 signal to allow 2 1 milliseconds transmit pulse ticks to occur before asserting the TX COMPLETE signal. The TX COMPLETE signal causes an interrupt to occur in microprocessor 42 that indicates the end of a transmission. After transmission has completed, the act of reading the TX Status register by microprocessor 42, causes a TX STATUS READ signal to clear transmitter 73 in preparation for the next transmission. FIG. 10B shows the timing characteristics of transmitter 73 at different points within the block diagram of FIG. 10A.

Figure 11A:
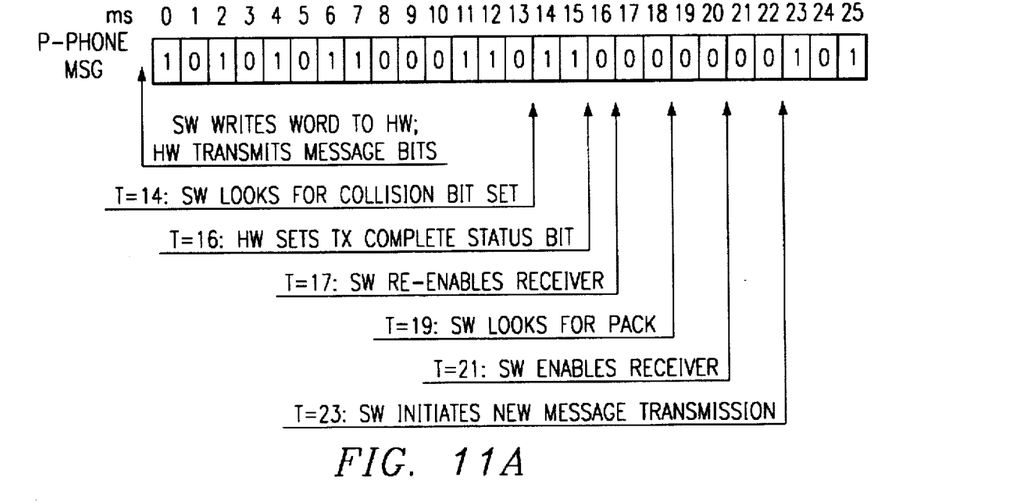
FIGS. 11A–B illustrate a message transmission capability of the signaling gate array.
Figure 11B:
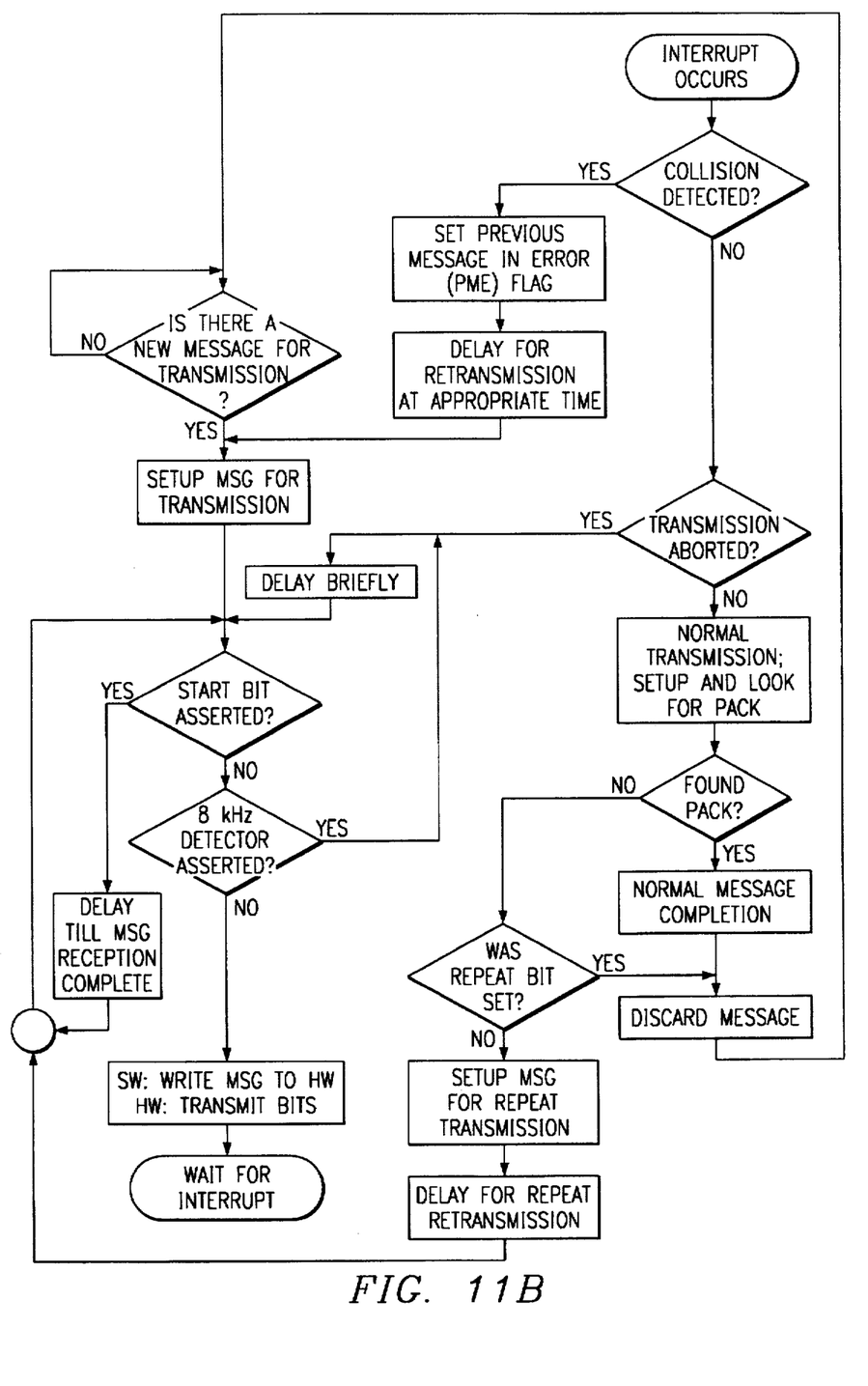

FIGS. 11A–B show the timing and flow performed by software within microprocessor 42 for transmission of an 8 kHz transmit signaling message. FIG. 11A shows the timing for normal loop message transmission. FIG. 11B shows the steps performed during message transmission.

Upon an indication that there is a new message for transmission, microprocessor 42 checks to determine if a start bit is asserted in status register. If so, microprocessor 42 delays transmission until message reception is complete. If the start bit is not asserted, microprocessor 42 checks for activity on the 8 kHz detector output of 8 kHz detector 60. If 8 kHz activity is present, microprocessor 42 delays transmission and rechecks for start bit assertion and 8 kHz activity. If there is no start bit asserted and no 8 kHz activity, microprocessor 42 places the 8 kHz transmit signaling message in a specified location for transmission by 1 millisecond transmit tick pulse at the 8 kHz zero crossings. Transmission commences and continues until an interrupt occurs.

Microprocessor 42 monitors the gate array 40 during transmission of the 8 kHz transmit signaling message for an interrupt. When an interrupt occurs, microprocessor 42 checks the collision bit to determine if a collision is present. If the collision bit is set, the internal Previous Message in Error flag is set and the message is processed for subsequent retransmission. If the collision bit was not set, microprocessor 42 checks the status of a TX Abort register in gate array 40 that indicates that 8 kHz activity occurred while transmitter section 52 was awaiting the zero crossing of the 8 kHz sine wave oscillator. If the TX Abort signal is set, microprocessor 42 delays transmission until the start bit is not asserted and 8 kHz activity is no longer present. If the TX Abort signal is not set, a normal transmission took place as indicated by an assertion of the TX Complete signal.

After the TX Complete signal has been asserted, microprocessor 42 enables receiver section 50 and begins monitoring for reception of the positive acknowledge signal from electronic business set telephone 22. Upon receiving a positive acknowledge signal, normal message transmission has completed, the message is discarded, and microprocessor 42 prepares to send the next 8 kHz transmit signaling message. If a positive acknowledgment has not been received, microprocessor 42 checks the status of the repeat bit. If the repeat bit is set, the message is discarded to prevent repeated transmissions of the same message. If the repeat bit is not set, microprocessor 42 sets the repeat bit and prepares for retransmission.

Figure 12A:
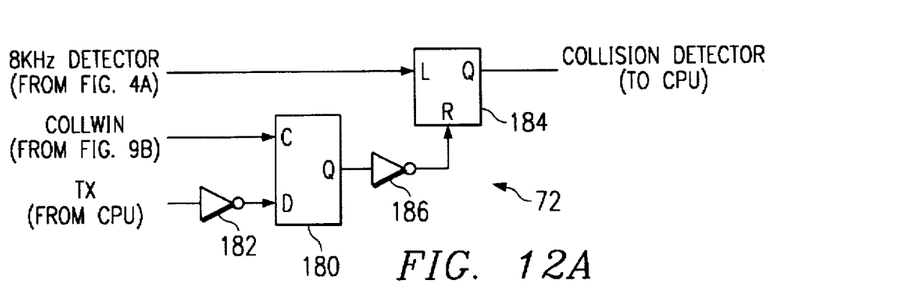
FIGS. 12A–C illustrate block and timing diagrams of a detection portion of an avoidance collision detector of the signaling gate array.
Figure 12B:
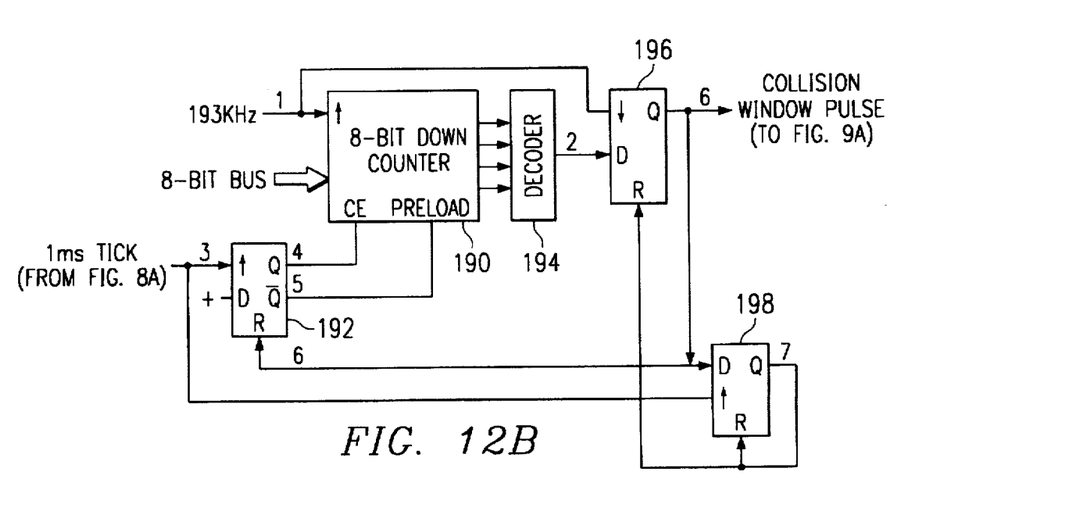
Figure 12C:
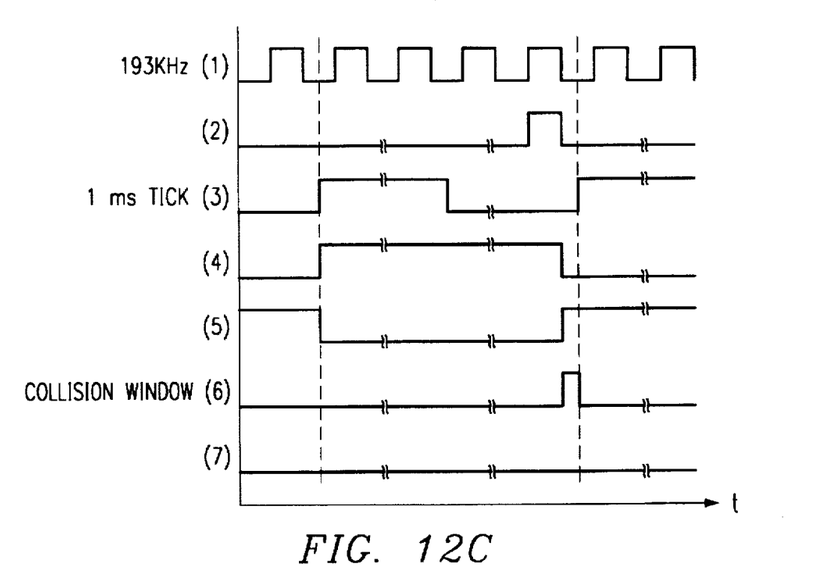

FIGS. 12A–C show block and timing diagrams of the detection portion of collision avoidance detector 72 in transmitter section 52. In FIG. 12A, collision avoidance detector 72 receives transmit signal TX from microprocessor 42 at a latch 180 through an inverter 182. Collision avoidance detector 72 also receives the 8 kHz detector output from 8 kHz detector 60 at a latch 184. Latch 184 receives the output from latch 180 through an inverter 186 and generates a collision detector output that is monitored by microprocessor 42 through microprocessor interface 54.

To implement collision detection, collision detector 72 monitors the 8 kHz detector 60 for activity when microprocessor 42 is transmitting a zero and the collision window pulse is asserted. The collision window pulse clocks the data from inverted transmit signal TX to the output of latch 180. If transmit signal TX is a one, then a one is being transmitted and latch 180 will clock a zero to the reset line of latch 184. In this instance no collision checking can occur. When transmit signal TX is a zero, the next edge of the collision window pulse will cause the reset line to de-assert and enable latch 184 to store the status of the 8 kHz detector output. The resulting logic level will stay asserted until the next collision window pulse. Gate array 40 reads the status of the collision detector output prior to sending the next data bit, and if asserted, reports collision to microprocessor 42.

FIG. 12B is a block diagram showing the generation of the collision window pulse. The width of the collision pulse is established by a software programmable 8 bit value received at an 8 bit down counter 190. The 8 bit value is preloaded into 8 bit down counter 190, clocked in at a rate of 193 kHz and enabled by the rising edge of the 1 millisecond transmit pulse tick from transmitter 73 through latch 192. A decoder 194 determines when 8 bit down counter 190 has counted down to zero from the preloaded 8 bit value, setting latch 196 and resetting latch 192 to inhibit 8 bit down counter 190 and preload 8 bit down counter 190 again with the 8 bit value. At the next 1 millisecond transmit pulse tick, latch 196 is reset by the output of a latch 198, clearing the collision window pulse and causing 8 bit down counter 190 to again start counting down to zero. FIG. 12C shows the timing characteristics at various points in the generation of the collision window pulse within the block diagram of FIG. 12B.

Figure 13:
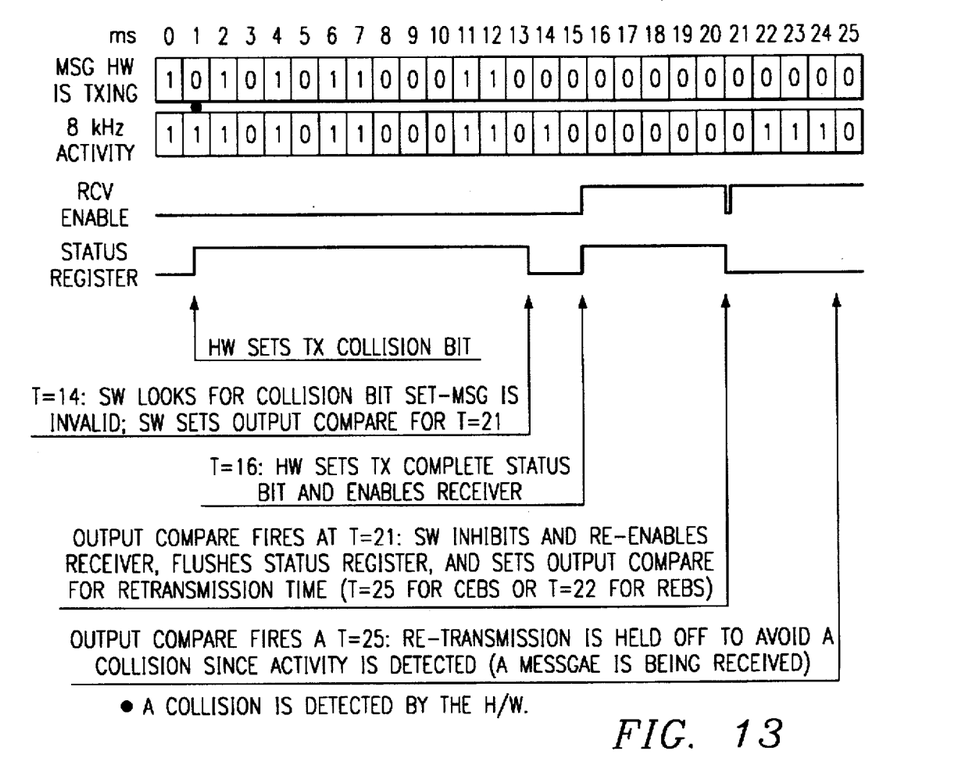
FIG. 13 illustrates a collision detection capability of the signaling gate array.

FIG. 13 shows how collisions are handled by microprocessor 42. During transmission of a logic level zero bit of an 8 kHz transmit signaling message, collision detector 72 checks for the presence of 8 kHz activity which indicates that another transmitter is sending a logic level one. The presence of 8 kHz activity on the line during transmission of a logic level zero is registered as a collision. The collision window pulse ensures that the remnants of a previously transmitted logic level one bit is not detected as a collision. In this example, a collision occurs at the second bit of the 16-bit 8 kHz transmit signaling message. Collision detector 72 asserts the collision detector output which forces the collision bit in the 8 kHz transmit signaling message to a zero to indicate that a collision has occurred. Microprocessor 42 sees that the collision bit is set and prepares the message for retransmission. After all of the bits of the message are sent, the TX COMPLETE signal is asserted and receiver 50 is re-enabled. Microprocessor 42 holds off retransmission of the message until there is no 8 kHz activity on the receive line.

Figure 14A:
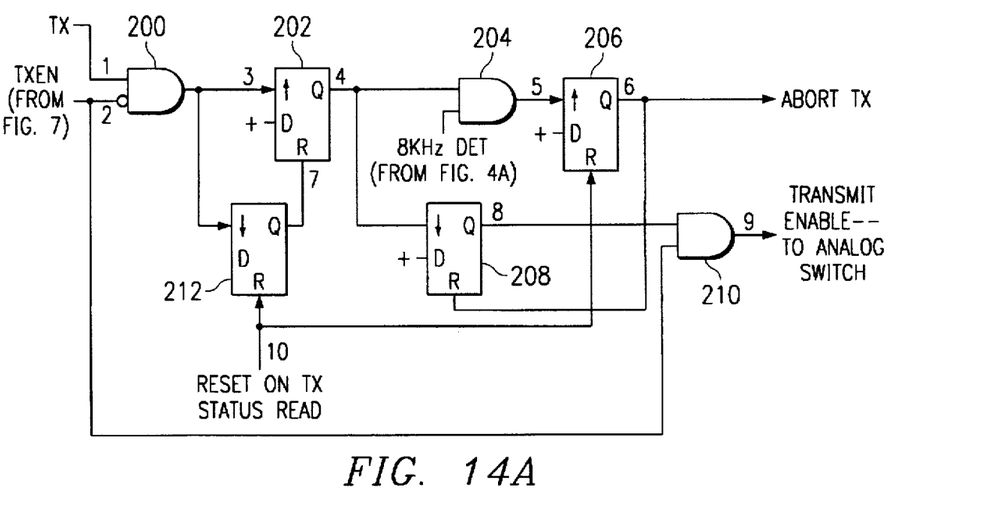
FIGS. 14A–B illustrate block and timing diagrams of a collision avoidance section of the collision avoidance detector in the signaling gate array.
Figure 14B:
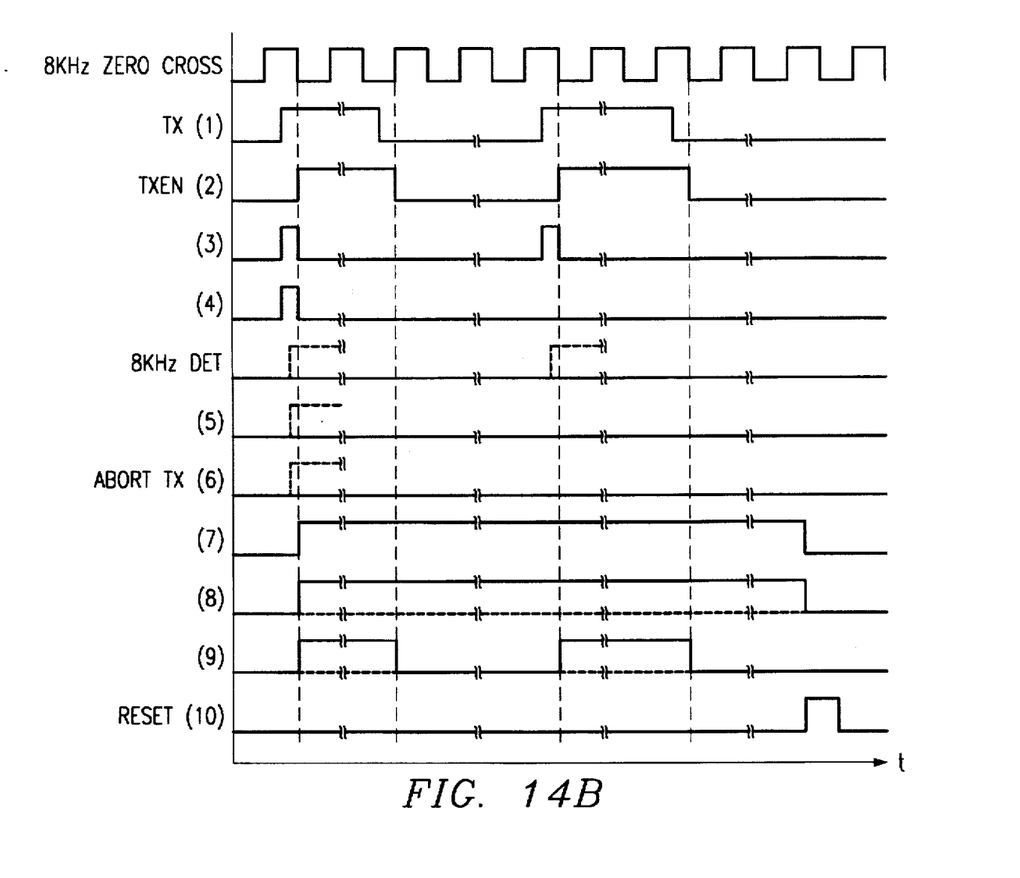

FIGS. 14A-B show the collision avoidance detector. Prior to writing a 16 bit 8 kHz message, microprocessor 42 monitors the status of the 8 kHz detector output from 8 kHz detector 60. If a receive message is in the process of being received, microprocessor 42 holds off transmission of the 16 bit 8 kHz message until the receive message has been completely received. A time delay occurs when the gate array 40 is ready to transmit a 16 bit 8 kHz message and when the next zero crossing of the 8 kHz oscillator occurs. During this time a receive message may be in the reception process and thus this collision potential must be avoided. To provide for collision avoidance, collision avoidance detector in FIG. 14A monitors the 8 kHz detector output of 8 kHz detector 60 just prior to start of a transmission.

Transmit signal TX is received from gate array 40 at logic gate 200 when a one is to be sent. TX ENABLE signal will be asserted at a later time when the 8 kHz zero crossing occurs. The output of logic gate 200 is latched through a TX latch 202 whose output is compared with the 8 kHz detector output at logic gate 204. The output of logic gate 204 is fed to an abort latch 206 that asserts an ABORT TX signal when the 8 kHz detector output indicates activity in the delay time between the assertion of transmit signal TX and the zero crossing assertion of TX ENABLE signal. If the 8 kHz detector output indicates no activity, then an avoidance enable signal is generated through a latch 208 and a logic gate 210 to initiate transmission of the 8 kHz message.

If the abort TX signal is asserted indicating the presence of activity on the 8 kHz detector output, microprocessor 42 holds a record of the message for later transmission. The message is maintained until microprocessor 42 is informed that a successful transmission and a successful positive acknowledgment has occurred. Microprocessor 42 generates a TX reset signal to clear the collision avoidance portion of collision avoidance detector 72 through a latch 212 for the next message transmission. If collisions occur during message transmission, the detection portion of collision avoidance detector 72 handles any such occurrences. FIG. 14B shows the timing characteristics of the collision avoidance portion of collision avoidance detector in FIG. 14A at various points.

Figure 15:
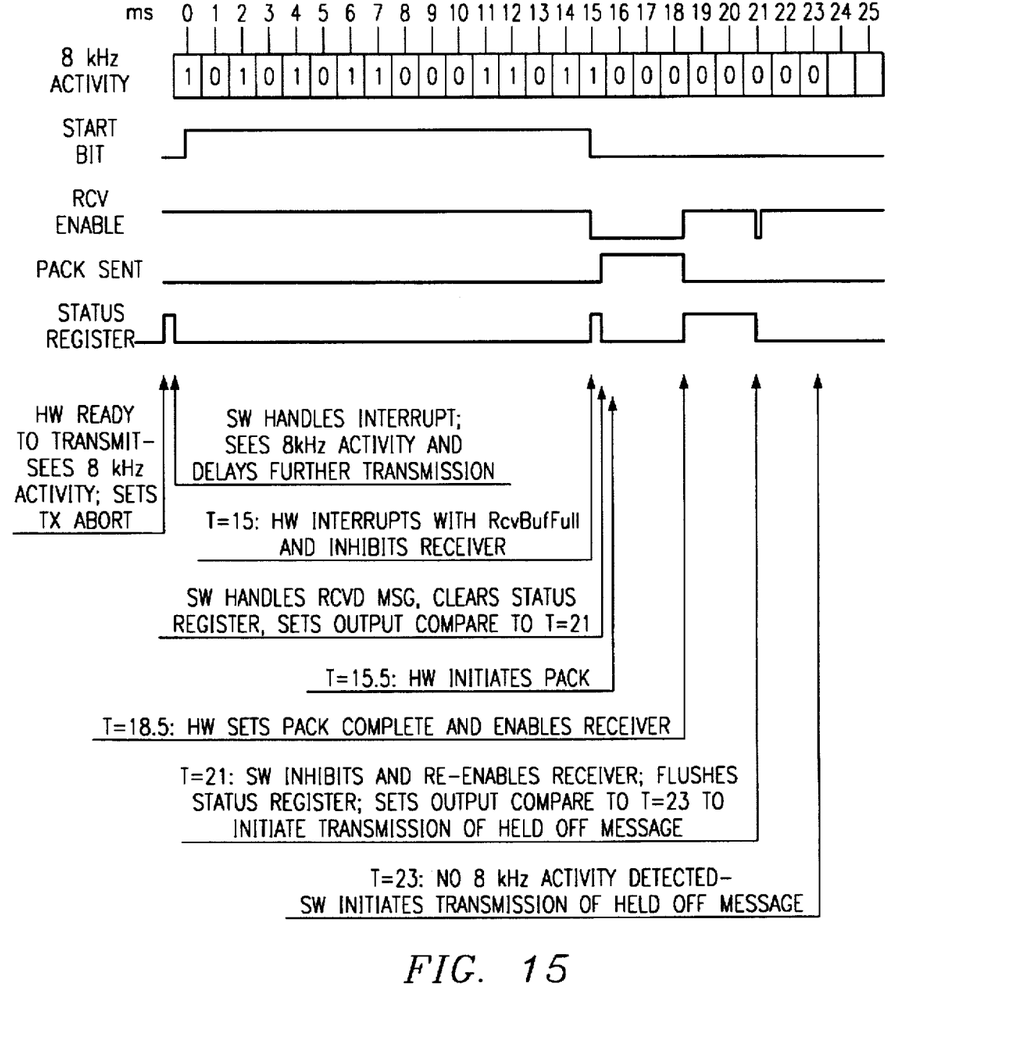
FIG. 15 illustrates a collision avoidance capability of the signaling gate array.

FIG. 15 shows how collisions are avoided by microprocessor 42. When microprocessor 42 asserts the transmit signal TX indicating that an 8 kHz transmit signaling message is ready for transmission, transmission is delayed until a zero crossing occurs on the 8 kHz oscillator square wave. If any 8 kHz activity occurs within this delay period, collision avoidance detector in FIG. 14A asserts the ABORT TX signal as an interrupt for microprocessor 42. Microprocessor 42 handles the interrupt by delaying transmission and processing the 8 kHz activity which is reception of a message. After normal message reception, microprocessor 42 prepares the held message for transmission and the presence of 8 kHz activity is rechecked before transmission can begin.

In summary, line cards providing 8 kHz message processing provide improved collision detection and collision avoidance techniques. These techniques ensure efficient and accurate 8 kHz message transmission and reception. Collisions are avoided by monitoring for 8 kHz activity immediately prior to the start of message transmission. Collisions are detected while sending each zero bit of an 8 kHz message and the use of a collision window ensures that true collisions can be detected. Network delays in 8 kHz message transmission and reception are also avoided through early return of positive acknowledge signals without waiting for transmission over the entire network connection.

Thus, it is apparent that there has been provided, in accordance with the present invention, a method and apparatus for avoiding collisions in an electronic business set terminal that satisfies the advantages set forth above. Although the present invention has been described in detail, it should be understood that various changes, substitutions, and alterations can be made herein. For example, different timing features and circuit implementations can be used to provide similar functional operation. Other examples are readily apparent to one skilled in the art and could be made without departing from the spirit and scope of the present invention as defined by the following claims.

APPENDIX A

Signaling Message Format

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| Strt 1 | Dir | A0 | A1 | A2 | D0 | D1 | D2 | D3 | D4 | D5 | D6 | D7 | Rpt | Coll | Par |
| | | | Address | | | | | | Command Bytes | | | | | | |

Signaling Message Bit Definitions

| Bit (s) | Description of Function |
|---------|------------------------|
| Start | Always a 1. Signifies the start of transmission. |
| Direction | Message Direction. 0==> CPE to CO (BSS to REBS, CEBS to DMS-100) 1==> CO to CPE (DMS-100 to CEBS, REBS to |

APPENDIX A-continued

| | |
|---|---|
| | BSS) |
| Address | The 3-bit address of the receiving or sending BSS. These bits are ignored by the linecard and simply passed through unchanged. |
| Command | The 8-bit command to be acted on by the BSS or the CO. These bits are ignored by the linecard and simply passed through unchanged, except for Voice-On, Voice-Off, handset-On, Handset-Off, and Hard Reset messages from CO to CPE that are used to set the status of the Busy Led. |
| Repeat | Normally 0, set to 1 on messages which are being retransmitted due to non reception of PACK. |
| Collision | Normally 1, set to 0 when the transmitting device detects a collision during the previous bits of message transmission. Tells receiving end to ignore the message. |
| Parity | This bit is set such that the total number of ones in the message (including this bit) is odd. |

What is claimed is:

1. A method of avoiding collisions in an electronic business set terminal, comprising the steps of:

determining that a transmit message is ready to be sent over a half duplex communication path;

awaiting for a clock signal to provide a zero crossing indication, the transmit message being sent in response to the zero crossing of the clock signal;

determining whether a receive message is in the process of being received over the half duplex communication path;

determining whether receive activity is occurring over the half duplex communication path while awaiting the zero crossing indication;

sending the transmit message on the half duplex communication path in response to the zero crossing indication and no receive activity occurring over the half duplex communication path and no receive message in the process of being received over the half duplex communication path.

2. The method of claim 1, further comprising the steps of:

delaying transmission of the transmit message in response to receive activity occurring over the half duplex communication path.

3. The method of claim 2, further comprising the step of:

sending the transmit message in response to no receive activity occurring on the half duplex communication path.

4. The method of claim 1, further comprising the step of:

delaying transmission of the transmit message in response to a receive message in the process of being received over the half duplex communication path.

5. The method of claim 4, further comprising the step of:

sending the transmit message in response to completion of reception of the receive message.

6. The method of claim 1, further comprising the steps of:

establishing whether receive activity on the half duplex communication path having a first level is occurring at each bit of the transmit message having a second level;

generating a collision signal in response to receive activity having a first level occurring upon transmission of a transmit message bit having a second level, the collision signal indicating that the transmit message being sent is unreliable.

7. The method of claim 6, further comprising the steps of:

asserting a collision window at a pre-set time interval after transmission of a previous transmit message bit;

checking for receive activity occurring within the collision window.

8. The method of claim 6, further comprising the step of:

re-sending the transmit message at a later time period.

9. The method of claim 1, further comprising the steps of:

awaiting receipt of an acknowledgment signal indicating completion of transmission of the transmit message;

preparing to send a next transmit message upon receipt of the acknowledgment signal.

10. The method of claim 9, further comprising the step of:

re-sending the transmit message upon not receiving the acknowledgment signal after a pre-defined time period.

11. The method of claim 10, further comprising the step of:

discarding the transmit message after a pre-determined number of re-sending attempts.

12. An apparatus for avoiding collisions in an electronic business set terminal, comprising:

a receiver section operable to determine activity on a signaling signal;

a start bit detector operable to determine a beginning of a receive message on the signaling signal, the start bit detector operable to generate a start bit signal, the start bit signal indicating that a receive message is in the process of being received;

a transmitter section operable to determine that a transmit message is ready to be sent, the transmitter section operable to send the transmit message in response to a zero crossing of a clock signal;

a collision avoidance section operable to delay sending of the transmit message in response to the start bit signal.

13. The apparatus of claim 12, further comprising:

a collision detector operable to determine activity on the receive signal prior to sending each bit of the transmit message.

14. The apparatus of claim 13, wherein the collision detector is disabled for transmit message bits being at a first one of two logic levels.

15. The apparatus of claim 13, wherein the collision detector is operable to generate a collision signal, the collision signal indicating a presence of activity on the signaling signal during the transmission of the transmit message.

16. The apparatus of claim 15, wherein the collision signal is operable to set a collision flag in the transmit message, the collision flag indicating that the transmit message is unreliable.

17. The apparatus of claim 12, wherein the collision avoidance section is operable to delay sending of the transmit message in response to activity on the signaling signal.

18. The apparatus of claim 12, wherein the transmitter section is operable to generate a receive inhibit signal, the receive inhibit signal operable to disable the start bit detector during transmission of the transmit signal.

19. The apparatus of claim 13, wherein the collision detector is operable to receive a collision window pulse, the collision detector determining activity on the signaling signal during activation of the collision window pulse.

20. The apparatus of claim 19, wherein the collision window pulse is asserted at a pre-defined time interval after transmission of each bit of the transmit message.

* * * * *